Oct. 26, 1943.  A. L. KNOX ET AL  2,332,650
AUTOMATIC RECORD CHANGING APPARATUS
Filed Dec. 31, 1940    7 Sheets-Sheet 1
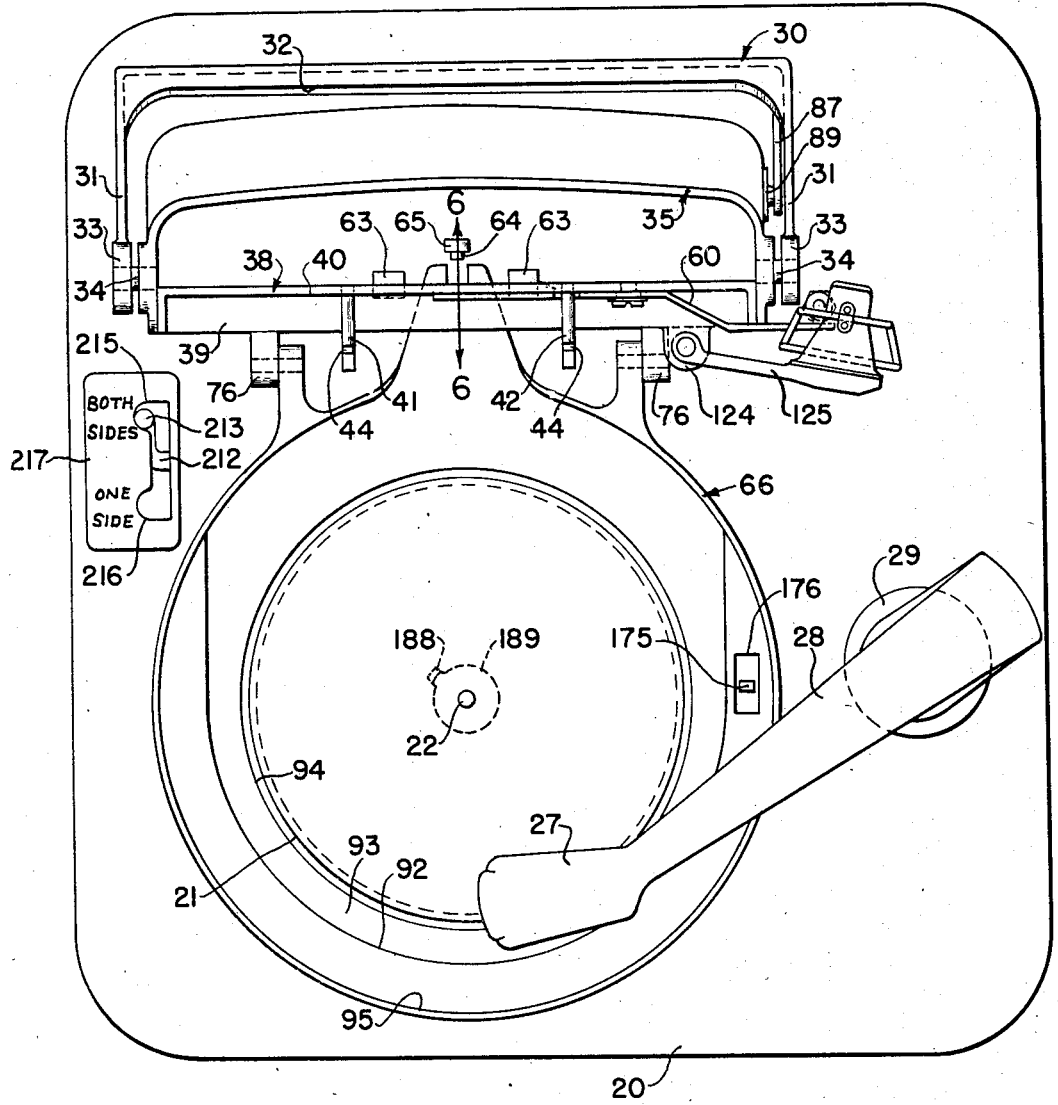
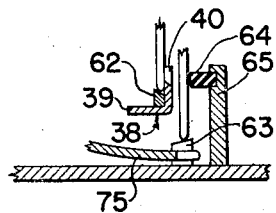
INVENTORS
ARTHUR L. KNOX
FRITZ KAHL
BY
ATTORNEY Oct. 26, 1943.   A. L. KNOX ET AL   2,332,650
AUTOMATIC RECORD CHANGING APPARATUS
Filed Dec. 31, 1940   7 Sheets-Sheet 2
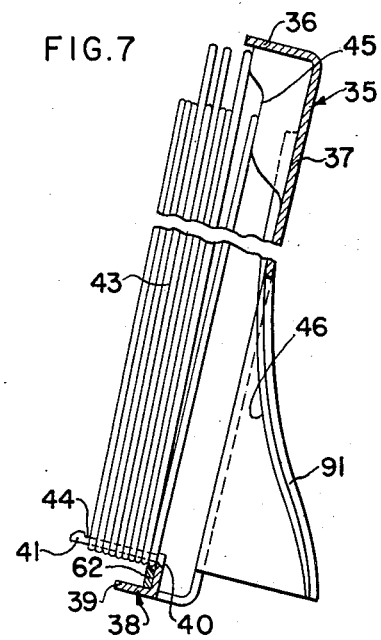
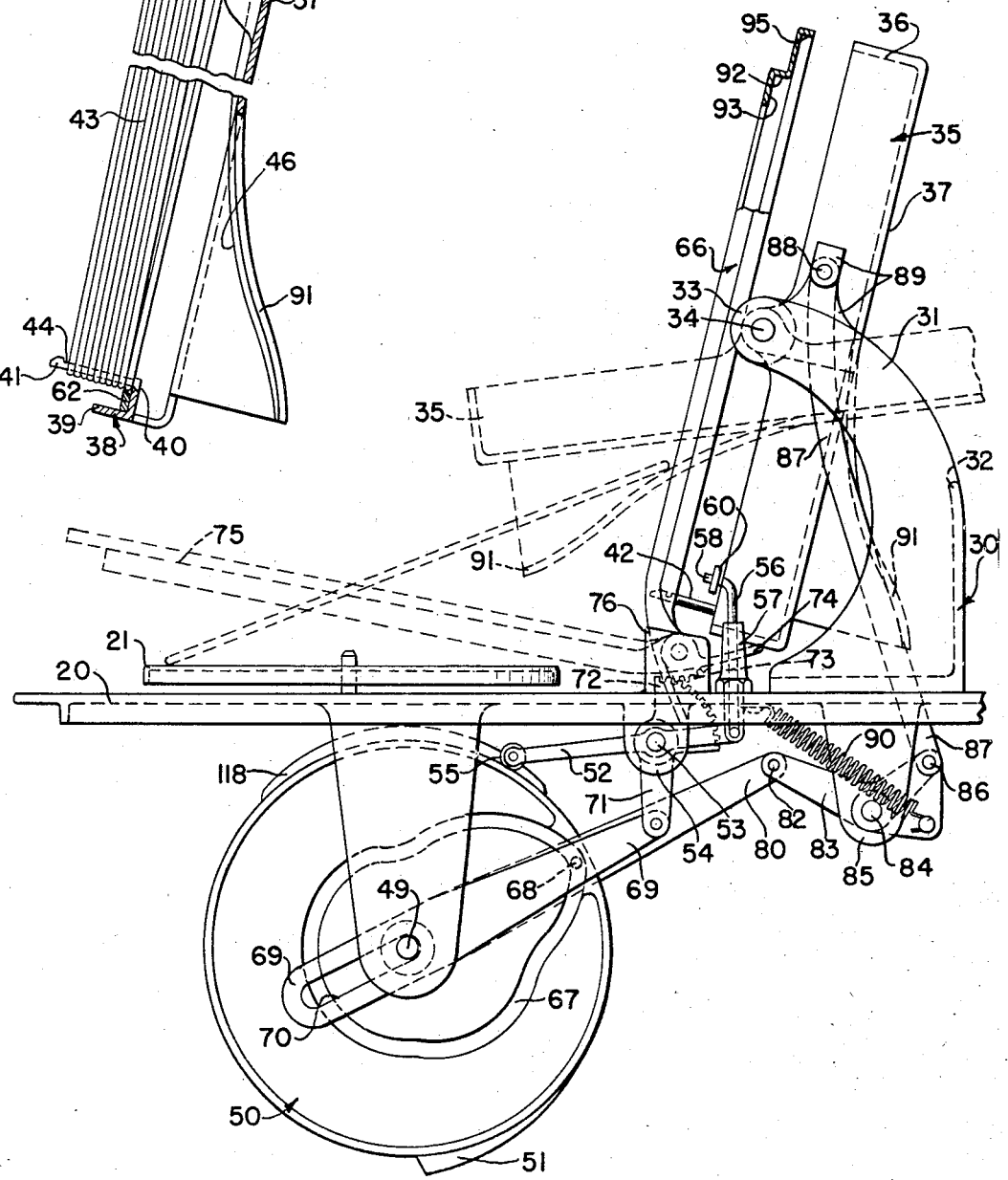
INVENTORS
ARTHUR L. KNOX
FRITZ KAHL
BY
ATTORNEY Oct. 26, 1943.  A. L. KNOX ET AL  2,332,650
AUTOMATIC RECORD CHANGING APPARATUS
Filed Dec. 31, 1940  7 Sheets-Sheet 3

INVENTORS
ARTHUR L. KNOX
FRITZ KAHL
BY
ATTORNEY

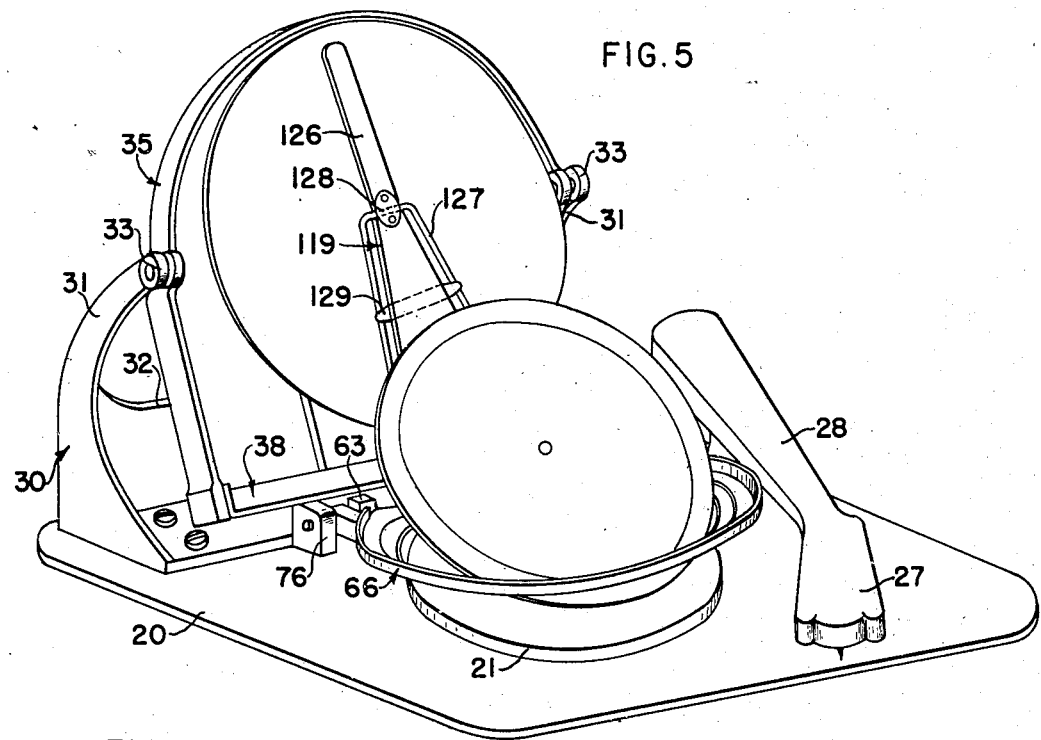
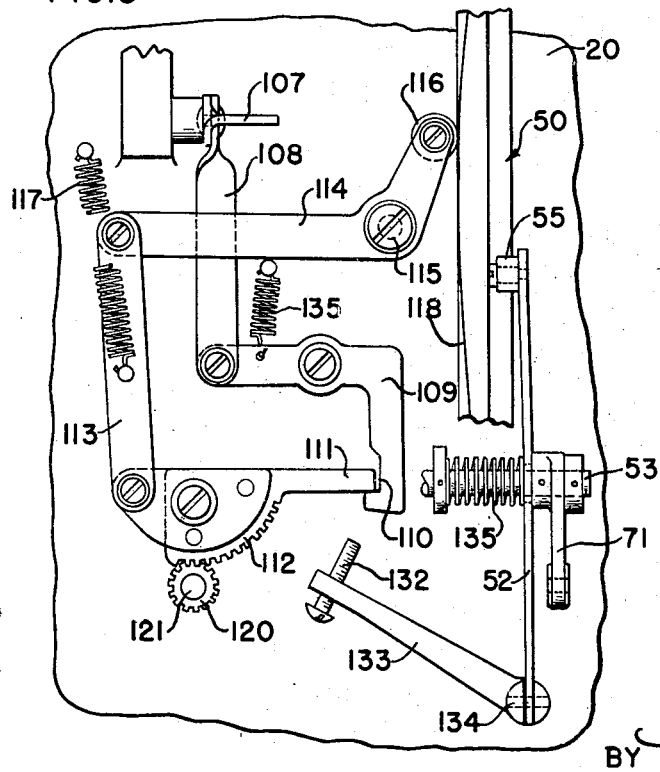

Oct. 26, 1943.   A. L. KNOX ET AL   2,332,650
AUTOMATIC RECORD CHANGING APPARATUS
Filed Dec. 31, 1940   7 Sheets-Sheet 5
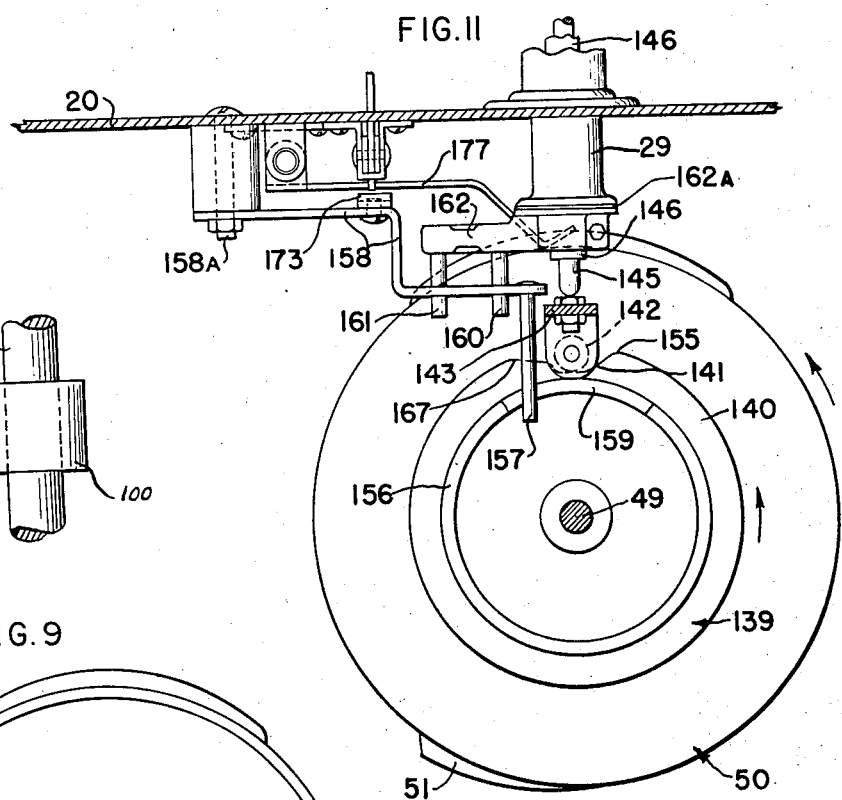
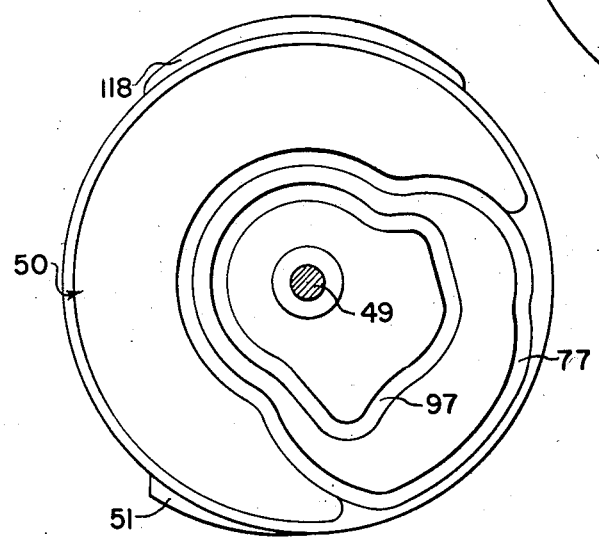
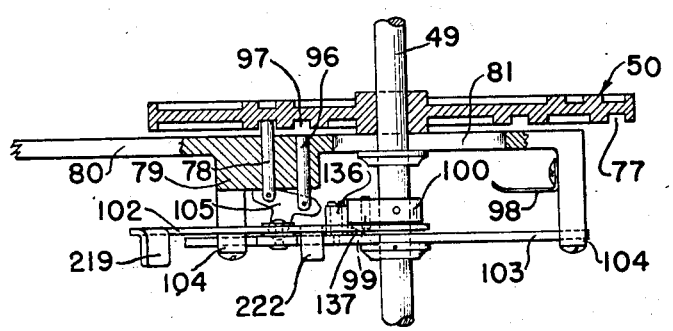
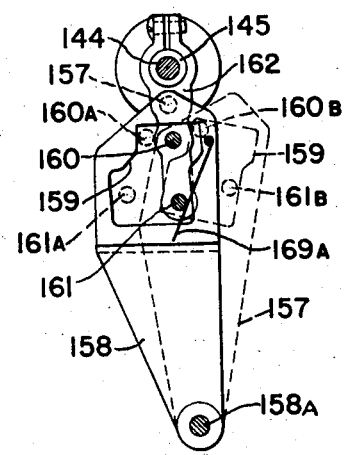
INVENTORS
ARTHUR L. KNOX
FRITZ KAHL
BY
ATTORNEY

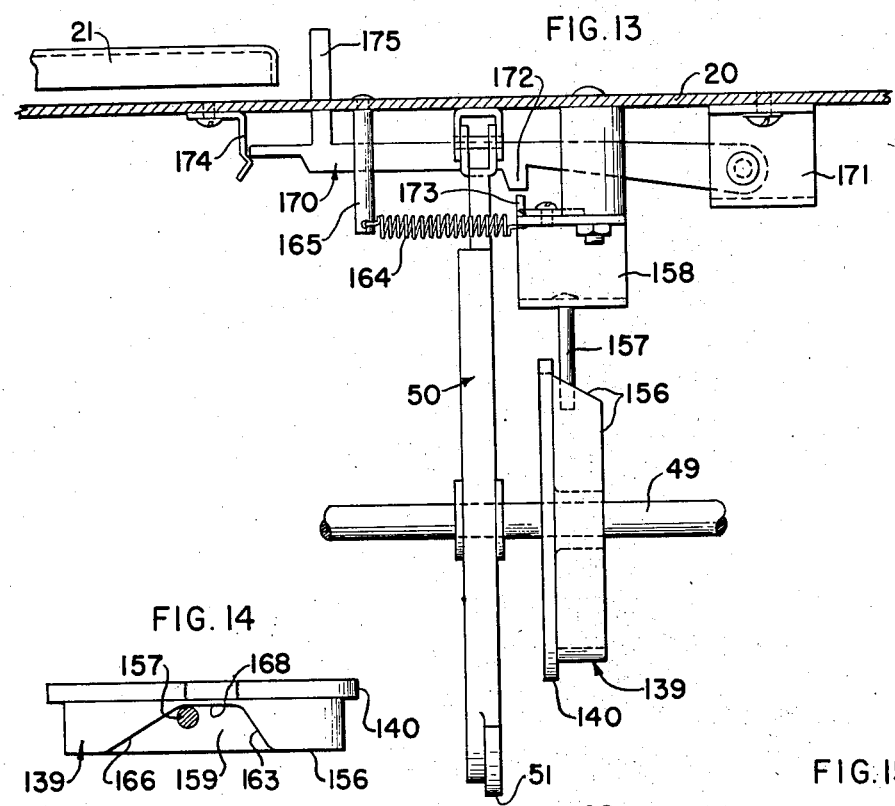
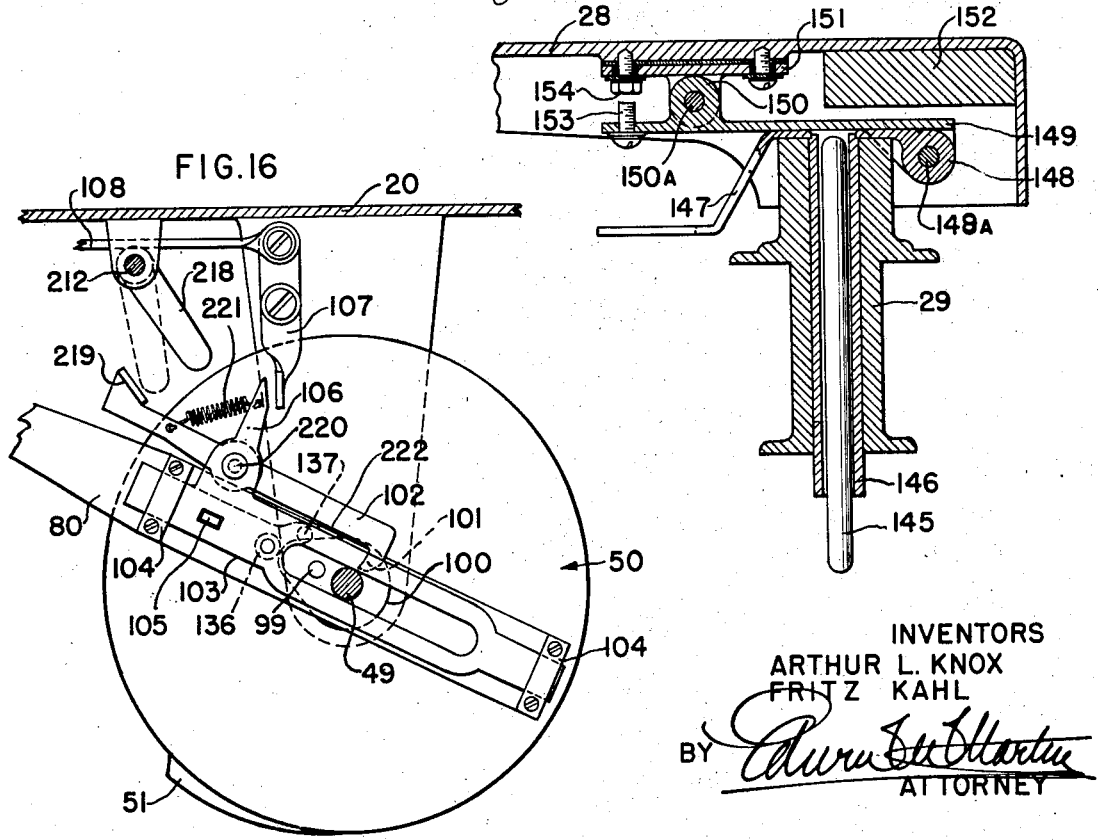

Oct. 26, 1943.  A. L. KNOX ET AL  2,332,650
AUTOMATIC RECORD CHANGING APPARATUS
Filed Dec. 31, 1940  7 Sheets-Sheet 7

INVENTORS
ARTHUR L. KNOX
FRITZ KAHL
BY [signature]
ATTORNEY

Patented Oct. 26, 1943

2,332,650

UNITED STATES PATENT OFFICE 2,332,650

AUTOMATIC RECORD CHANGING APPARATUS

Arthur L. Knox and Fritz Kahl, Fort Wayne, Ind., assignors to Farnsworth Television and Radio Corporation, a corporation of Delaware Application December 31, 1940, Serial No. 372,681

7 Claims. (Cl. 274—10)

This invention relates to automatic record-changing apparatus, and more particularly to new and useful improvements embodied in such apparatus.

An object of the present invention is to provide an improved and simplified mechanism for controlling the movement of a magazine in an automatic record-changing apparatus.

A further object of the present invention is to provide an improved mounting for a pickup arm used with record-changing apparatus.

A further object of the present invention is to provide an improved mechanism for controlling the movement of the pickup arm used with record-changing apparatus.

In accordance with the present invention, there is provided an automatic record-changing apparatus comprising a magazine, a cam wheel, and a connecting member associated with the magazine and having first and second elements. The first and second elements are adapted to cooperate with the cam wheel at different times to move the magazine over different distances. The record-changing apparatus also includes a rotating member with a reciprocating member associated therewith. The reciprocating member is adapted to be positioned during the preceding cycle of the said cam wheel for moving, during the beginning of the following cycle of the cam wheel, the first element out of cooperative relationship with the cam wheel, and the second element into cooperative relationship with the cam wheel for moving the magazine over a different distance.

In accordance with a further feature of this invention, there is provided a phonograph including a turntable, a pickup arm, and a supporting means for said pickup arm. The supporting means for the pickup arm comprise a shaft with a first bearing element and an elevating means associated with the shaft. A member with a second bearing element is adapted to pivot on the first bearing element of the shaft. The second bearing element is adapted to pivotally support the pickup arm when a stylus of the pickup arm is in engagement with a record on the turntable. A pivot transfer means is associated with the member and is adapted to engage the pickup arm when the elevating means moves a stylus of the pickup arm out of engagement with a record on the turntable. Upon the engagement of the pivot transfer with the pickup arm, the pivotal movement of the pickup arm is transferred from the second bearing element to the first bearing element.

In accordance with a further feature of the present invention, there is provided an automatic record-changing apparatus comprising a turntable, a pickup arm for cooperating with a record on the turntable and a cam means for moving the pickup arm. A swinging means, which is associated with the pickup arm and the cam means, imparts to the pickup arm a relatively fast outward movement and a relatively slow inward movement.

In accordance with a further feature of the present invention, there is provided an automatic record-changing apparatus comprising a turntable, a pickup arm for cooperating with a record on the turntable, and a cam means for moving the pickup arm. A first means is associated with the cam means and the pickup arm for imparting a raising and lowering movement to the pickup arm. A second means is associated with the cam means and the pickup arm for imparting to the pickup arm an outward and an inward movement. A spring means is associated with the second means for moving a stylus of the pickup arm into the outer groove of a record on the turntable after the stylus of the pickup arm is brought into engagement with a record on the turntable.

For a better understanding of the invention, together with other and further objects thereof, reference is made to the following description taken in connection with the accompanying drawings, and its steps will be pointed out in the appended claims.

In the accompanying drawings:

Fig. 1 is a top plan view of the record-changing apparatus;

Fig. 2 is a side elevational view showing a partial assembly of the record-changing apparatus;

Fig. 5 is a perspective view of the upper portion of the record-changing apparatus shown in the act of reversing a record;

Fig. 6 is a detailed sectional view taken on line 6—6 of Fig. 1;

Fig. 7 is a vertical sectional view through the record magazine showing the location of the records therein;

Fig. 8 is a fragmentary view showing the locking mechanism for the record-reversing member and the mechanism for placing the record-releasing device out of operative position;

Fig. 9 is a view showing the side of the cam wheel with the continuous cam grooves which control the pivotal movement of the magazine;

Fig. 10 is a sectional view of the cam wheel and its associated parts which cooperate in pivotally moving the magazine;

Fig. 11 is a view looking in the direction of the arrows of line 11—11 of Fig. 4, showing the mechanism for moving the pickup arm in a horizontal plane and a vertical plane;

Fig. 12 is a fragmentary view showing the associated elements for moving the pickup arm horizontally;

Fig. 13 is a fragmentary view showing the mechanism for positioning of the pickup arm at the outer groove of twelve-inch records;

Fig. 14 is a view of the cam wheel showing the cam surface for moving the pickup arm horizontally;

Fig. 15 is a sectional view showing the double pivotal support for the pickup arm;

Fig. 16 is a fragmentary view showing the mechanism for setting the record-changing apparatus to play one or both sides of a record;

Fig. 22 is a fragmentary elevational view showing a cam in the magazine controlling mechanism.

Referring particularly to Fig. 1 of the drawings, the invention is illustrated as having a base or supporting plate 20. Disposed above the base plate is a horizontally rotatable turntable 21 supported by a centering pin 22 journaled for rotation in a bearing set in the base plate 20.

Figure 4:
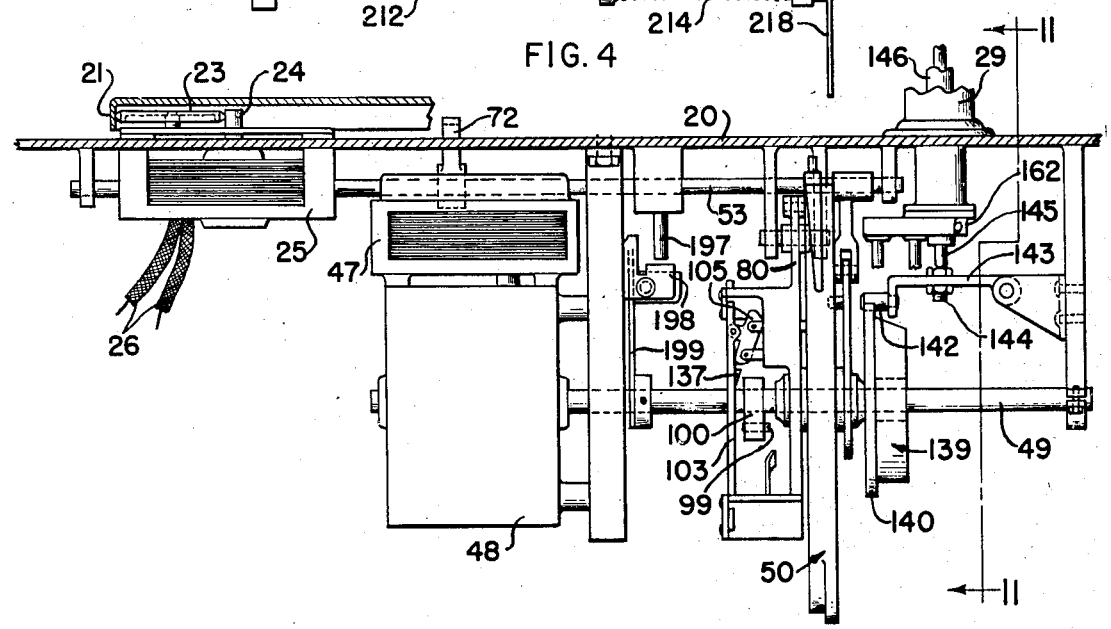
Fig. 4 is a front elevational view of the lower portion of the record-changing apparatus.

As shown in Fig. 4, the turntable 21 is driven by a friction wheel 23 shown to engage the rim of the turntable 21. The friction wheel 23 is operatively connected by means of a shaft 24 to an electric motor 25 supported from brackets fixed below the base plate 20. Current is supplied to the motor 25 from a suitable source through conductors 26.

A reproducer 27 (Fig. 1) cooperates with the records supplied to the turntable 21. The reproducer 27 is supported at the end of a pickup arm 28, the other end of which is pivoted on a pedestal 29. The pickup arm is so mounted as to permit the reproducer 27 to move in a horizontal and vertical plane. Means are provided, after the stylus of the pickup arm 28 reaches the inner groove of the record for elevating the pickup arm and swinging the pickup arm horizontally to position the stylus of the pickup arm for engagement with the outer groove of a record on the turntable. This means will be described in detail hereafter.

Figure 3:
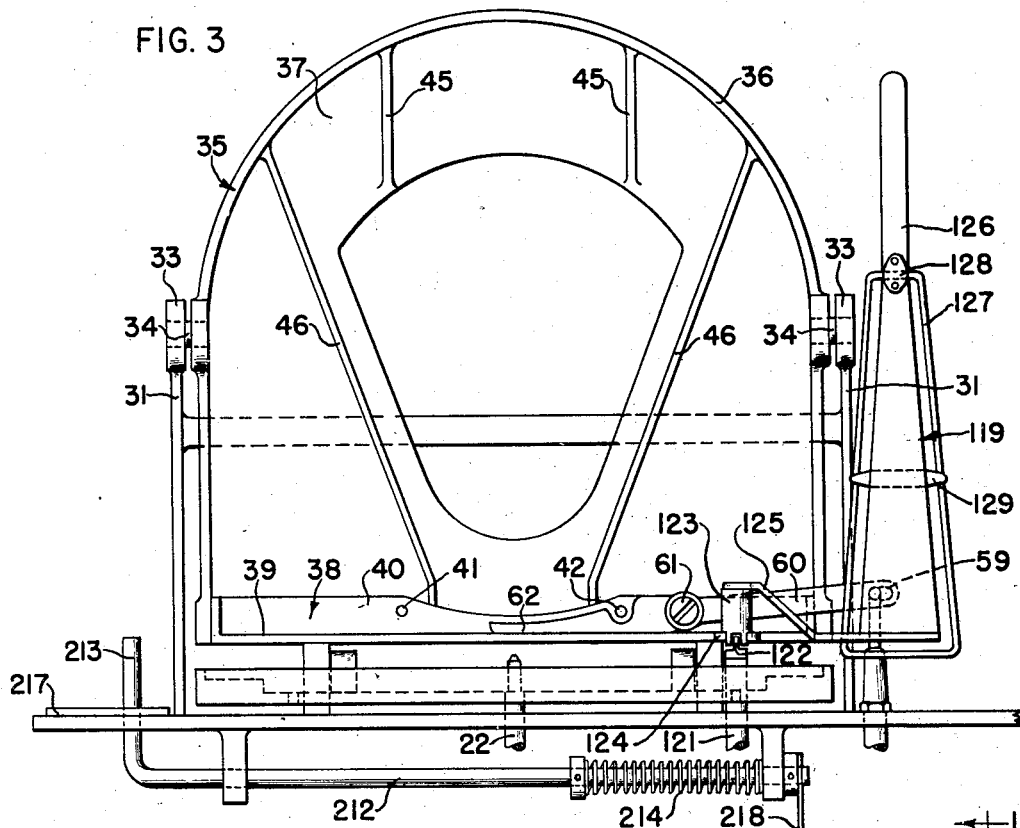
Fig. 3 is a front elevational view of the upper portion of the record-changing apparatus.

Means are provided for supporting a plurality of intermixed records of different sizes. This means includes a bracket 30 (Figs. 1 and 5) fixedly secured to the base plate 20. The bracket 30 has a pair of upwardly curved spaced arms 31 connected and braced by a web 32. The enlarged ends of the arms 31 provide bearings 33 (Figs. 1 and 3) for short shafts or studs 34 of a record magazine or reservoir 35 (Figs. 2 and 3). The reservoir or magazine 35 is mounted in the bearings 33 for a swinging movement between the solid line position and the dotted line position shown in Fig. 2 of the drawings.

The magazine 35 includes a forwardly projecting flange 36 (Figs. 2 and 3), a back portion 37 and a lower cross-member 38 connecting the lower ends of the side portions of the flange 36. A sectional view of the cross-member 38 is shown in Figs. 6 and 7 of the drawings. It is apparent from these figures that this member is angular in shape having a substantially horizontal portion 39 and a substantially vertical portion 40. Carried by the member 38 at points equally spaced from the center, on the vertical portion 40, are a pair of forwardly projecting pins 41 and 42 (Fig. 1) disposed to be engaged by the lower edge of a stack of records 43 to support the weight of the records in the magazine 35 as shown in Fig. 7. These pins may be notched near the ends at 44 to prevent the records from slipping off.

Formed on or secured to the back 37 of the magazine 35 are pairs of ribs 45 and 46 (Fig. 3). The rear record of the stack of records 43 will have its upper peripheral portion in engagement with the ribs 45 (Fig. 7) when the records are stored. The ribs 46 function in transferring a record from the magazine 35 to the turntable 21 as will be described hereafter.

Means are provided for transferring the supported records one at a time from the magazine 35 to the turntable 21. The first step in this operation is to separate a record from the stack of records 43 (Fig. 7). This requires the cooperation of an electric driving motor 47 and a gear box or speed reducer 48 which are disposed on the underside of the base plate 20 as shown in Fig. 4 of the drawings. This driving mechanism is arranged to rotate a shaft 49.

Secured to the shaft 49 is a large cam wheel 50 having in its sides cam tracks or grooves to be described later, and having on its periphery a cam 51 shown in Fig. 2, for operating a mechanism to chop or remove a record from the magazine 35. A lever 52 is pivoted intermediate its ends on a shaft 53 which is carried by a bracket 54 depending from the underside of the base plate 20, Fig. 2. At one end, the lever 52 carries a roller 55 which is adapted to engage the cam 51 on the periphery of the cam wheel 50, when it is desired to feed a record from the magazine 35 to the turntable 21.

The opposite end of the lever 52 is pivotally connected to an upwardly extended rod 56 (Fig. 2) passing through the base plate 20 and a guide 57 secured to the upper side of the base plate 20. At its opposite end the rod 56 is bent forwardly and its forward portion 58 passes through an elongated opening 59 in a knife or chopping lever 60 shown in Fig. 3. This lever 60 is pivoted intermediate its ends at 61, to the member 38 of the magazine 35.

The opposite end of the lever 60 (Fig. 3) extends between the supporting pins 41 and 42, and the end 62 of the lever 60 lies closely against the vertical portion 40 of the member 38 as shown in Figs. 6 and 7. The upper surface of the end 62 of the lever 60 inclines downwardly toward the vertical portion 40 of the member 38 as is best shown in Fig. 6. The center portion of the vertical leg 40 of the member 38 is scooped out or cut away as clearly shown in Fig. 3. The record in the magazine 35 which rests against the ribs 45 also rests on the portion 62 of the lever 60, and against the vertical leg 40 of the cross-member 38.

When the cam wheel 50 is rotated so that the cam 51 (Fig. 2) strikes the roller 55, the lever 52 is rocked on its pivot 53 drawing downwardly the rod 56. This in turn rocks the end 62 of the lever 60 upwardly. This movement of the lever 60 elevates the record resting on it and the record slides downwardly out of the magazine and lands with its lower edge resting on spaced cushioning pads or blocks 63 disposed on the base plate 20 shown in Figs. 1 and 6. The partially removed record is held against rearward movement at its lower edge by a pad 64 on an upright 65.

The next step is to move the record from the cushioning pads or blocks 63 to the turntable 21. This is accomplished by the cooperative movement of the magazine 35 and a pan 66. The movement of the pan 66 is achieved in the following manner.

The cam wheel 50 (Fig. 2) is provided with a cam groove 67 in which is disposed a guiding pin 68 which is carried by an arm 69 slotted at its lower end as at 70. The shaft 49 passes through the slotted portion of the arm 69 to serve as a bearing for the arm. At the upper end of the arm 69 there is pivotally connected a lever 71 which lever is secured at its upper end to the shaft 53. Also secured to the shaft 53 is a segmental gear 72 spaced along the shaft 53 from the lever 71 as shown in Fig. 4, and having teeth in mesh with a segmental gear 73 formed on the underside of a rearwardly extended tongue or projection 74, of the record-carrying and guiding means or pan 66 shown in Fig. 2.

The pan 66 (Fig. 1) is mounted to oscillate on brackets 76 projecting upwardly from the base plate 20 and is adapted to be swung by the segmental gear 72 through an arc from the full line position of Fig. 2 to the dotted line position, and thus to a position surrounding and below the turntable 21. When a record has been released from the magazine onto the cushioning pads 63, the rearwardly extending tongue 74 of the pan 66 is disposed below these pads 63. As the pan 66 is swung downwardly on its pivots 76 toward the dotted line position by the segmental gear 72 which is driven in a manner previously described, the tongue projection 64 swings upwardly between the pads 63, and engages the lower edge of the released record and elevates it.

As the pan 66 moves downwardly in cooperating to move the released record to the turntable, the magazine 35 is swung in the bearings 33 through an arc from the full line position shown in Fig. 2 to the dotted line position shown in the same figure. For the purpose of swinging the magazine through the arc, the cam wheel 50 is provided with a cam groove 77 (Figs. 9 and 10) which guides a pin 78. This pin is slidably mounted in a block or enlarged boss 79 of a sliding beam 80 (Figs. 2 and 10). When the pin 78 is in the cam groove 77, the beam 80 pivots the magazine 35 for cooperating in moving a new record to the turntable. The beam 80, by means of an elongated opening 81 at one end thereof, is slidably mounted on the shaft 49. At the other end, the beam 80 is pivotally connected as at 82 (Fig. 2) to an arm of a bell-crank lever 83 pivoted as at 84 on a bracket 85 depending from the underside of the base plate 20. The opposite end of the bell-crank lever 83 is connected as at 86 to a link 87 which is connected at its upper end as at 88 to a bracket 89 fixedly secured to the magazine 35 (Figs. 1 and 2). Referring to Figs. 1 and 2, it will be apparent that the bracket 89 is disposed on the magazine 35 rearwardly of the pivot studs 34, and that when the beam 80 is moved upwardly by engagement of the pin 78 in the cam groove 77, the bell-crank lever 83 will be rocked in a clockwise direction against the biasing with the aid of the tension of a spring 90. The spring 90 is affixed to the base plate 20 and an extension of the lever 83 (Fig. 2) in such a manner that, when the magazine 35 is in the full-line position shown in Fig. 2, the spring 90 is under tension. As the bell-crank lever rocks it will operate through the link 87 and pivot the magazine 35 from the full-line position to the dotted-line position of Fig. 2.

This movement of the magazine 35 occurs shortly after the tongue 74 of the pan 66 (Fig. 2) has engaged and moved the new record from the pads 63. The rear portion 37 of the magazine 35 flares outwardly as at 91 (Figs. 2 and 7). The upper portion of the released record is, of course, in contact with the back 37 of the magazine before it is moved to the turntable.

As the pan 66 is pivoted downwardly in the manner previously described, the record slides forwardly on the pan 66. The movement of the magazine 35 assists the forward movement of the record, one edge of which is elevated and resting against said magazine and the other edge of which extends through the pan 66, engaging and sliding across the surface of the turntable. During the record-changing process the turntable rotates but the record is held from lateral movement by the inner edge of the pan 66.

If a ten-inch record is being placed on the turntable, its forward edge will engage a vertical wall 92 of the pan 66 (Figs. 1 and 2), and its forward movement will be stopped. Now, as the cam wheel 50 continues to rotate with the shaft 49, having completed one-half of a revolution, the pin 78, in following the cam track 77, will cause the beam 80 (Fig. 2) to move downwardly, and in moving cause the bell-crank lever 83 to move in a counter-clockwise direction, being assisted by the tension spring 90. As the bell-crank lever 83 moves in a counterclockwise direction, the link 87 moves the magazine 35 back to its full-line position, shown in Fig. 2. As the magazine 35 swings back to the latter position, the rear edge of the record is gradually lowered into a properly centered position on the turntable 21.

It is to be noted that the edge of the record first comes into engagement with the turntable on the opposite side of the centering pin 22 so that the record is not hindered in its sliding movement. Further, the turntable is covered with a suitable material to permit sliding a record across it, but at the same time having sufficient traction so that a record maintains a fixed position when it is being played.

The pan 66 is designed to guide and accommodate different sized records. With this in view, the pan is provided in one plane with an annular portion 93 having a center opening defined by the line 94. The central opening is of slightly greater diameter than the diameter of the turntable 21. This is apparent by referring to Fig. 1. The turntable is of less diameter than the smallest record to be played. The arc defined by the wall 92 has a radius equal to the radius of a ten-inch record.

When a twelve-inch record is released from the magazine 35, and is moved into playing position upon the turntable, in the same manner as previously described for a ten-inch record, it jumps over the wall 92, owing to its greater diameter, and its forward edge contacts a wall 95 of the pan 66 (Figs. 1 and 2). The inner circumference of the wall 95 has a radius equal to the radius of a twelve-inch record. This wall 95 limits the forward movement of a twelve-inch record, and as the magazine is swung back to the full-line position of Fig. 2, in the same manner as previously described, the twelve-inch record is let down and properly centered on the turntable 21.

The magazine 35 cooperates in reversing a record on the turntable by being moved to rotate on the bearings 34. This movement of the magazine 35 is different from the movement of the magazine 35 when it cooperates to move a new record to the turntable. This difference is achieved by having a pin 96 of the beam 80 cooperate with a cam groove 97 of the cam wheel 50 to guide the beam 80 in moving the magazine 35.

Just before beam 80 completes its movement for pivoting the magazine 35 to cooperate in moving a new record to the turntable, the beam 80 brings a flat spring 98 mounted thereon, as shown in Fig. 10, into position so that a spring-biased pin 99, which is mounted in a cam 100 which rotates with shaft 49, is moved downwardly to the position shown in Fig. 10.

When the shaft 49 and the cam wheel 50 begin to rotate to carry out a record-reversing operation, the pin 78 of the beam 80 is in engagement with the cam groove 77 of the cam wheel 50 and the pin 99 is in the position shown in Fig. 10.

As the shaft 49 continues to rotate, the cam 100 moves the pin 99 into engagement with a hooked end 101 of a lever 102 (Figs. 10 and 16) which is supported pivotally to a member 103. The engagement of the pin 99 with the hooked end 101 of the lever 102 as the cam 100 rotates, causes the member 103 to move to the right (Fig. 10) in a pair of bearings 104. This movement of the member 103 moves a T-shaped lever 105, which is connected pivotally to a member 103, to withdraw the pin 78 from the cam groove 77 and to move the pin 96 into the cam groove 97 (Figs. 9 and 10). With the pin 96 following the cam groove 97 of the cam wheel 50, the beam 80 pivots the magazine 35 to cooperate in reversing a record on the turntable.

While the member 103 is moved downwardly (Fig. 16) as just described, the upper end of a finger 106 provided on the member 103 engages and moves a lever 107 in a counterclockwise direction (Fig. 16). This movement of the lever 107 by means of a connecting lever 108 causes an L-shaped lever 109, which is mounted pivotally to the base plate 20, to rotate in a counterclockwise direction. This movement of the lever 109 causes an end 110 to move out of engagement with a finger 111 provided on a segmental gear 112 which is mounted pivotally to the base plate 20. A link 113 is connected to the segmental gear 112 and an L-shaped lever 114 as shown in Fig. 8. Lever 114 is connected pivotally to the base plate 20 at 115 and its supports at its other end, a roller 116. A spring 117 having one end anchored to the base plate 20 and the other end anchored to the link 113 moves the segmental gear 112 and the lever 114 in a clockwise direction when finger 111 and lever 109 are disengaged. But since the roller 116 on the end of lever 114 is in engagement with a cam surface 118 on the cam wheel 50, this clockwise movement of the lever 114 and segmental gear 112 is limited by the shape of the cam surface 118.

The clockwise movement of the segmental gear 112 as just described serves two purposes. It actuates the mechanism for swinging a reversing member 119 from the position shown in Fig. 3 to the position shown in Fig. 5 and it also moves the lever 52 out of operating position with the cam 51 of the cam wheel 50 so that the record-releasing lever 60 will not be operated during the record-reversing cycle.

The clockwise movement of the segmental gear 112 moves the reversing bar 119 in front of the magazine 35 by means of a pinion 120 which is affixed to a shaft 121 extending through the base plate 20. At the upper end of the shaft 121 there is formed a lug 122 (Fig. 3). This lug 122 enters a notch in the lower end of a stud 123 journaled in a bearing 124 (Figs. 1 and 3). To the upper end of the stud 123 is secured an arm 125 offset downwardly as shown in Fig. 3. At its free end the arm 125 carries the reversing member 119, including a flexible plate portion 126 and a spring frame 127 connected with the flexible plate 126 as at 128 and also by a spring piece 129. At the lower end, the frame-like member 127 is free of the flexible plate 126 and normally set forwardly thereof. When the segmental gear 112, as previously described, rotates the pinion 120 fixed to the shaft 121, the reversing member 119 will be swung from the position shown in Fig. 3 to the position shown in Fig. 5.

The clockwise movement of the segmental gear 112 also moves out of operating relationship, a mechanism for moving the record-releasing lever 60. As the segmental gear 112 rotates in a clockwise direction the finger 111 affixed thereto engages the end of a screw 132 secured to the end of an arm 133, which is fixed to the lower end of the rod 56 (Figs. 2 and 8) to move therewith. As the arm 133 is moved by engagement of the finger 111 in a clockwise direction (Fig. 8), the rod 56 is rotated in a counterclockwise direction. The counterclockwise rotation of the rod 56 moves laterally in a counterclockwise direction the lever 52, one end of which is connected to the rod 56 by the pin 134. Intermediate its ends, the lever 52 is formed in such a manner that it is adapted to be mounted on the shaft 53 to slide thereon laterally and to pivot thereon in a vertical plane as shown in Fig. 8. A spring 135 is fixed to the shaft 53 and is engaged operatively with the lever 52. Normally, the spring 135 maintains the lever 52 in a position so that the roller 55 is maintained in the path of the cam portion 51 of the cam wheel 50. When the lever 133 is moved in a counterclockwise direction by the finger 111, the lever 52 is moved in a counterclockwise direction against the tension of the spring 135 to move the roller 55 out of the path of the cam portion 51 of the cam wheel 50. When the lever 52 is out of the path of the cam surface 51, it cannot operate to move the record-releasing lever 60.

After the reversing member 119 is swung in front of the magazine 35, as shown in Fig. 5, the pan 66 is pivoted to move a record from the turntable to a position against the reversing member 119. Immediately thereafter, the pan will gradually move back to the position below the turntable and the magazine 35 will be moved on the bearings 34 to assist in centering the record in reverse position upon the turntable.

After the record has been returned to the turntable in reverse position, the reversing member 119 is swung back to the normal position on the side of the magazine 35. This is accomplished by the engagement of the roller 116 with a portion of the cam surface 118. As a result of this engagement, the lever 114 and the segmental gear 112 are moved in a counterclockwise direction. The counterclockwise movement of segmental gear 112 rotates the pinion 120 of the shaft 121 in a clockwise direction to swing the reversing member 119 outwardly.

The counterclockwise movement of the segmental gear 112 also moves the finger 111 out of engagement with the screw 132. This allows the spring 135, which is under compression, to move the lever 52 back into the path of the cam 51 on the cam wheel 50 so as to operate the record-releasing lever 60.

Near the end of the record-reversing cycle, pin 96 is brought out of engagement with the cam groove 97 and the pin 78 is brought back into engagement with the cam groove 77. This is accomplished by bringing the cam 100 into engagement with a roller 136 mounted on the member 103. This engagement of the cam 100 with the roller 136 moves the member 103 which transmits rocking motion to the T-shaped lever 105 to withdraw pin 96 from cam groove 97 and to move the pin 78 into engagement with the cam groove 77. The continued movement of the cam 100 after the retraction of pin 96 from engagement with the cam groove 97, moves the pin 99 into the path of a small wedge-shaped projection 137 which is secured to the member 103. The engagement of the pin 99 with the projection 137 moves the spring-biased pin 99 of the cam member 100 upwardly (Fig. 10) so that the positions of the pins 78 and 96 are not changed during the next record-changing cycle.

When the stylus of the pickup arm 28 reaches the inner groove of a record, the pickup arm is elevated and then swung outwardly in a horizontal plane to a position where it will not interfere with a record-changing cycle.

The means for elevating the pickup arm includes a cam wheel 139 (Figs. 4 and 11) fixed to the shaft 49. The cam wheel 139 has a cam surface 140 with a notched portion 141. A roller 142, which is fixed to one end of a lever 143, is adapted to engage the cam surface 140. The other end of the lever 143 is connected to a bracket which is suspended from the base plate 20 so that the lever 143 may pivot in a vertical plane. An adjustable screw 144 is supported by the lever 143 intermediate its ends. The screw 144 supports a rod 145 which extends upwardly in a hollow shaft 146. The shaft 146 is rotatable within the pedestal 29 and is adapted to move vertically therein. The shaft 146 has an irregular-shaped plate 147 fixed to the top thereof. The plate 147 is adapted to move freely over the top of the pedestal 29. One end of the plate 147 is provided with a bearing 148 which pivotally supports a plate 149 by means of a pin 148A. Intermediate the ends of the plate 149 there is provided a bearing 150 which pivotally supports a bracket 151 by means of a pin 150A. The pickup arm 28 is affixed to the bracket 151 so as to pivot on the bearing pin 150A when the stylus of the reproducer 27 is in engagement with a record on the turntable. A suitable weight 152 is provided in the end of the pickup arm 28 as shown in Fig. 15 to maintain a predetermined stylus pressure on the record on the turntable. An adjustable screw 153 is provided on the other end of the plate 149 to come into contact with a surface such as 154 just before the stylus is brought out of engagement with the record as the pickup arm is being elevated for a record-changing operation. When the cam wheel 139 begins to rotate to elevate the pickup arm out of engagement with a record on the turntable, the roller 142 is in the notch 141. The rotation of the cam wheel 139 moves portion 155 of the cam surface 140 under the roller 142. The raising of the roller 142 and therewith the lever 143 moves the adjustable screw 144 which raises the rod 145. The raising of the rod 145 moves upwardly the plate 149 which is fixed to the plate 147. When the lever 149 is moved by the upward movement of the pin 145, the plate 147 is moved upwardly and therewith the hollow shaft 146. As the lever 149 moves upwardly the adjustable screw 153 engages the surface 154 and the pickup arm is elevated by pivotal movement about the axis of the pin 148A to lift the stylus out of engagement with the record.

In order to swing the pickup arm outwardly in a horizontal plane, the cam wheel 139 is provided with a cam surface 156, which is adapted to engage the pin 157. The pin 157 is affixed to one end of a plate 158 which is pivoted as at 158A to the base plate 20. The plate 158 is provided with an aperture 159 through which pins 160 and 161 extend. These pins 160 and 161 are affixed near one end of a lever 162, the other end of which is fixed to the shaft 146 to move therewith. The outward movement of the pickup arm begins when cam portion 163 of the cam surface 156 moves into engagement with the pin 157. This moves the plate 158 in a clockwise direction (Fig. 12). When the stylus of the pickup arm is in the tripping groove of a record on the turntable, the pins 160 and 161 are in the position 160A and 161A, as shown in Fig. 12. The clockwise movement of the plate 158 (Fig. 12) engages the left side of the aperture 159 with the pin 160 to move the pin 160 and the lever 162 attached thereto in a counterclockwise direction (Fig. 12). It is to be noted that any movement of the lever 162 while the pickup arm is out of engagement with a record on the turntable is against friction created by the engagement of the lever 162 with the base of the pedestal 29 as at 162A. The frictional engagement between the lever 162 and the pedestal 29 occurs when the shaft 146, to which the lever 162 is affixed, is raised, as has been previously described. The raising of the shaft 146 brings the upper surface of the annular end of the lever 162 into frictional engagement with the bottom surface of the pedestal 29. The clockwise movement of the plate 158 is against the biasing action of a spring 164 which has one end anchored to the plate 158 and the other end anchored to a pin 165 depending from the underside of the base plate 20 (Fig. 13). When the pins 160 and 161 have reached the position shown by 160B and 161B and the plate 158 has reached the position shown in dotted-lines in Figure 12, the pickup arm 28 has been swung to its outwardmost position.

After the record-changing cycle is complete, the cam wheel 139 has traveled to a position where the cam portion 166 of the cam surface 156 moves into engagement with the pin 157. The tension of the spring 164, which is sufficient to overcome the frictional resistance of the lever 162 created by its engagement with the base of the pedestal 29 (Fig. 13), thereupon starts to swing the plate 158 in a counterclockwise direction (Fig. 12) causing the righthand side of the aperture 159 to engage the pin 161 in the position indicated by 161B, moving the pin 161 and therewith the arm 162 in a clockwise direction (Fig. 12). During this latter movement of the plate 158 and the arm 162, the pickup arm is swung inwardly. When the cam wheel 139 and the pin 157 are in the position shown in Fig. 14, the pickup arm 28 is approximately over the outer groove of a record on the turntable.

It is to be noted that the inward movement of the pickup arm 28 is slower than its outward movement. This allows for the more accurate positioning of the pickup arm over the outer groove of a record on the turntable. The slower inward movement of the pickup arm is achieved by the shape of the cam 156 which includes the steep portion 163 which acts during the outward movement of the pickup arm and the gradual portion 166 which acts during the inward movement of the pickup arm. The speed of the inward and outward movement of the pickup arm is also due to the action of the plate 158 on the pins 160 and 161 at different times. When the pickup arm is being swung outwardly, the left side of the aperture 159 of the plate 158 (Fig. 12) acts on the pin 160. However, when the pickup arm is being swung inwardly, the right side of the aperture 159 of the lever 158 is acting on the pin 161 (Fig. 12). Since pin 161 is further from the axis of rotation of lever 162 than pin 160, it is obvious that pin 161 moves slower than pin 160 around the axis of rotation of the lever 162.

When the pickup arm 28 is in a position approximately over the outer groove of a record on the turntable, the portion 165 of the cam surface 140 moves under the roller 142. As the cam wheel 139 continues to rotate, the notch 141 gradually comes into engagement with the roller 142 which allows the lever 143 and the rod 145 to lower the pickup arm and therewith the stylus into engagement with the outer groove of a record on the turntable. With the lowering of the pickup arm, the lever 162 is brought out of frictional engagement with the pedestal 29.

Due to the fact that the outer grooves of disc records are not at exactly the same distance from their outer edges, the stylus does not always drop exactly into the outer groove of a record. Means are provided for moving the stylus into the outer groove of a record when the record is not provided with a feed-in groove. This means includes a tension spring 169A which is provided on the plate 158 as shown in Fig. 12.

When the pickup arm 28 is swung inwardly by the movement of the plate 158 (Fig. 12) as previously described, the pin 161 engages and forces the spring 169A outwardly thereby creating a tension on this spring. The tension created is not sufficient to overcome the frictional resistance of the lever 162 created by its movement against the base of the pedestal 29, but it is sufficient to swing the lever 162 when it is free of the pedestal 29. When the pickup arm 28 is swung inwardly by the plate 158, and is lowered into engagement with the record, as heretofore described, and the stylus has not engaged the outer groove of the record, the tension spring 169A, which is exerting a force upon the pin 161 (Fig. 12), thereupon moves the lever 162 and therewith the pickup arm 28 inwardly sufficiently far to move the stylus of the reproducer into engagement with the outer groove of the record.

Means are provided for limiting the inward movement of the pickup arm 28 so that the stylus may be positioned over the outer margin of a twelve-inch record. This means includes a lever 170 which is pivotally supported by a bracket 171 depending from the underside of the base plate 20, Fig. 13. Disposed intermediate the ends of the lever 170 is a depending gear 172 which is held out of the path of movement of a lug 173 provided on the plate 158, by means of a flat spring 174 depending from the base plate 20 and engaging the free end of the lever 170, as shown in Fig. 13. Near its free end, the lever 170 is provided with a finger 175 which extends upwardly through the base plate 20 sufficiently far to pass through an elongated aperture 176 provided in the pan 66 (Fig. 1) and extend above the base plate 20 and turntable 21 a suitable distance as indicated in Fig. 13. The location of the finger 175 in relation to the turntable, is such, as to lie in the path of a twelve-inch record, when said record is moved into playing position upon the turntable 21.

When a ten-inch record is released from the magazine and is placed upon the turntable, the periphery of the ten-inch record will not engage the finger 175 to release the lever 170. Thus, the plate 158 will swing into its normal position to move the pickup over the outer groove of a ten-inch record, as previously described. When a twelve-inch record is released from the magazine 35 and is moved into playing position upon the turntable, the periphery of the twelve-inch record engages the finger 175 (Figs. 1 and 13), and moves the finger 175 and therewith the lever 170 downwardly out of engagement with the spring catch 174. The lever 170 is released by the spring 174 after the plate 158 has moved the pickup arm 28 to its outermost position as heretofore described. When the plate 158 acts to swing the pickup arm 28 inwardly as previously described, the lug 173 engages the ear 172 which was released while the twelve-inch record was placed upon the turntable. The engagement of the lug 173 with the ear 172 takes place when the pickup arm 28 has been moved inwardly sufficiently far to position the stylus over the outer groove of the twelve-inch record. The engagement of the elements 172 and 173 takes place before the flat portion 166 of the cam surface 160 engages the pin 157. However, continued movement of the cam wheel 139 acts to lower the stylus into engagement with the outer groove of the twelve-inch record.

When the twelve-inch record is played and the tripping mechanism is actuated, in the manner presently to be described, the cam wheel 50 in rotating to return the played record to the magazine 35, causes the cam 51 to actuate the lever 52 to release a new record from the magazine 35. As the cam wheel 50 continues to rotate, the cam 51 engages a pivoted lever 177 (Fig. 11) and lifts the lever 177 in a vertical plane. This lever is arranged to engage the lower edge of the lever 170 (Fig. 13). Thus, as the lever 177 is raised, it engages and lifts the lever 170 to its normal position in engagement with the spring 174 as shown in Fig. 13. When the new record, previously released from the magazine, is lowered upon the turntable, (if it is a ten-inch record), the mechanism will remain in its normal position to play the ten-inch record. However, if the new record is a twelve-inch record, the mechanism will again be set automatically to position the pickup arm over the beginning of the twelve-inch record, as heretofore described.

The automatic record-changing or record-reversing cycle is actuated by the automatic tripping mechanism, previously mentioned, which will now be described in greater detail. The pickup arm 28, which has been lowered to engage the stylus with the outer groove of a record on the turntable, is moved inwardly by the stylus following the spiral groove on the record. In moving toward the center of the record, the pickup arm moves with it the plate 147.

Figure 17:
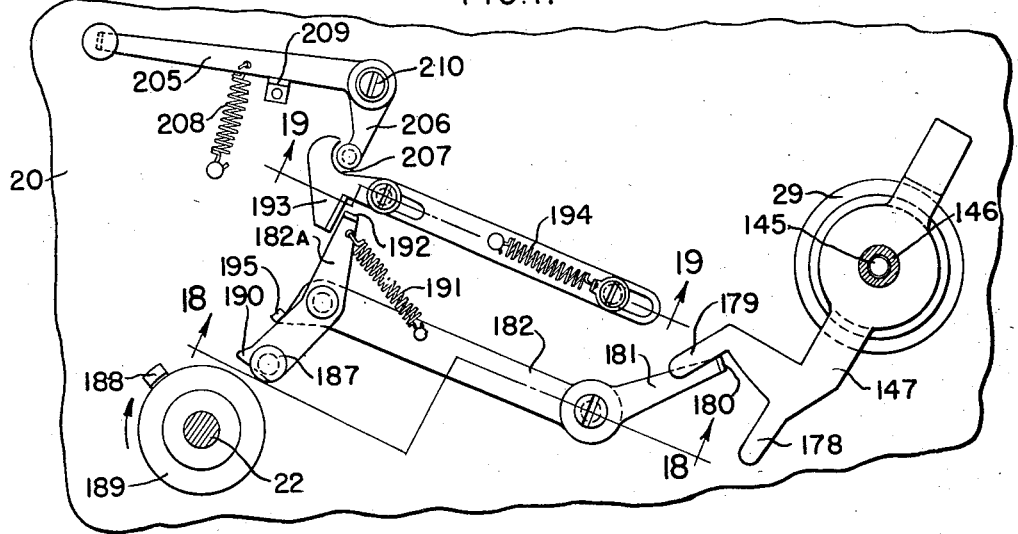
Fig. 17 is a fragmentary view showing the tripping mechanism.

Referring particularly to Fig. 17, the plate 147 is shown to have two fingers 178 and 179. As reproduction goes on and the pickup arm 28 moves toward the center of the record, the pickup arm moves with it the plate 147 in a clockwise direction (Fig. 17). As the pickup arm approaches the end of the record, the finger 178 engages a turned-up end 180 of the lever 181 (Figs. 17 and 18) and moves the lever in a counterclockwise direction. This lever 181 by means of frictional engagement moves a lever 182 which supports at its free end a pivotal spring-biased lever 182A (Figs. 17 and 18).

Figures 18, 19:
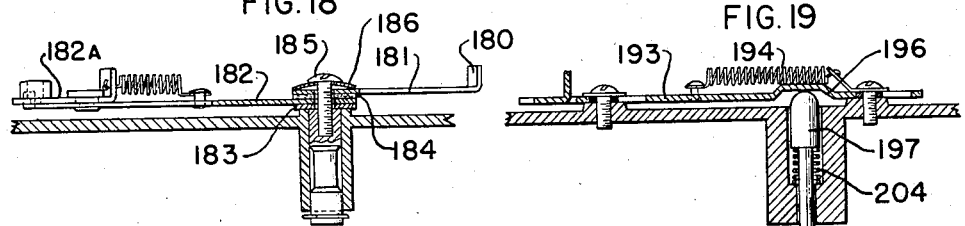
Fig. 18 is a partial sectional view taken on line 18—18 of Fig. 17, showing the clutch assembly of the tripping mechanism.
Fig. 19 is a sectional view taken on line 19—19 of Fig. 17, showing the mechanism for actuating the switch control member of the tripping mechanism.

The frictional connection between the levers 181 and 182 comprises a clutch mechanism which is constructed by placing the annular end portion of the lever 182 over a metallic washer 183 (Fig. 18). A friction washer 184 is placed over the annular end portion of the lever 182. The annular end portion of the lever 182 is adapted to rotate on the axis of a screw 185. The annular end portion of the lever 181, which also is adapted to rotate on the axis of the screw 185, is placed over the fiber washer 184. A spring washer 186 is placed over the annular end portion of the lever 181. The frictional connection between the levers 181 and 182 is adjustable by varying the tension of the spring washer 186 by turning the screw 185.

As the stylus of the pickup arm advances toward the center of the record with the ear 178 in engagement with the upturned end 180 of lever 181, the lever 181 moves the lever 182 in a counterclockwise direction. The spring-biased lever 182A fixed to the free end of the lever 182 moves with the lever 182 to move a fiber roller 187 affixed to one end of the lever 182A into the path of the movement of a lug 188. The lug 188 is fixed to a member 189 which is fixed to the under side of the turntable 21 and rotates therewith. Each time a record on the turntable makes one revolution, the lug 188 engages the roller 187 to move the lever 183 and the lever 182 in a reversed direction. However, due to the fact that the lever 181 is in engagement with the ear 178 and that there is a frictional connection between the levers 181 and 182, the reverse movement of the lever 182 is not transmitted to the lever 181. When the stylus moves into a tripping groove at the end of the record, which may be an eccentric groove or a spiral groove, the lever 183 is moved inwardly (Fig. 17) fast enough to move a hooked end 190 of the lever 183 into the path of the lug 188. The engagement of the lug 188 with the lever 183, causes the lever 183 to move in a counterclockwise direction against the biasing action of a spring 194 (Fig. 17). After the lug 188 moves past the end of the lever 183, the tension spring returns the lever 183 to its normal position, in to engagement with an ear 195 provided on the lever 182.

Figure 20:
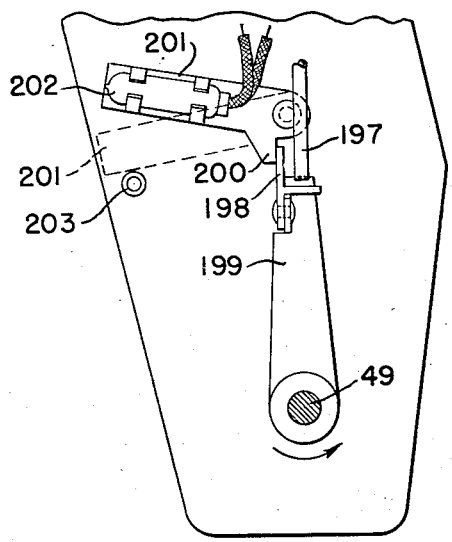
Fig. 20 is a fragmentary elevational view showing part of the mechanism for controlling the main driving motor switch.
Figure 21:
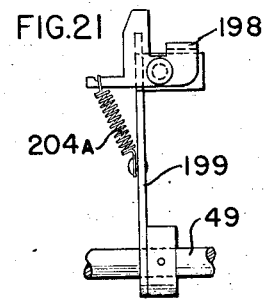
Fig. 21 is a fragmentary elevational view showing another portion of the mechanism for controlling the main driving motor switch.

The movement of the lever 193 (Figs. 17 and 19), causes an angular portion 196 (Fig. 19) to engage and move a spring-biased pin 197 downwardly. As the pin 197 moves downwardly, it engages and moves a spring-biased member 198 in a clockwise direction about its axis on a lever 199 which is fixedly secured to the shaft 49 (Figs. 4 and 21). As shown in Fig. 20, the upper end of the member 198 engages an ear 200 provided on a lever 201 which supports a mercury switch 202. The engagement of the elements 198 and 200 maintains the lever 201 in the solid line position of Fig. 20, whereas when the member 198 is actuated as previously described, the member 198 moves out of engagement with ear 200 permitting the lever 201 to drop to the dotted-line position shown in Fig. 20 and into engagement with a stop 203. With the lever 201 in the dotted-line position of Fig. 20, the element 202 operates to close an electric circuit to the motor 47 for starting it. Immediately after the mechanism is tripped, the spring 194 moves the lever 193 back to its normal position, permitting a spring 204 (Fig. 19) to return the pin 197 to the position shown in Fig. 19. When the pin 197 is raised, a spring 204A returns the member 198 to its normal position shown in Fig. 21.

The tripping mechanism starts the motor 47 which rotates the shaft 49 and therewith the cam wheels 50 and 139 for moving the pickup arm 28 and for carrying out a record-changing cycle. Just before the shaft 49 has completed its cycle of operation, the lever 199 which rotates with the shaft 49, moves the member 198 into engagement with the ear 200 and moves the lever 201 in a clockwise direction to the position shown in Fig. 20. When this occurs, the mercury switch 202 opens the electric circuit to the motor 47 and stops it.

In addition to the automatic tripping mechanism, there is also provided a manual, L-shaped spring-biased tripping lever 205 (Fig. 17). A toe 206 of the lever 205 extends into a hooked portion 207 provided on the lever 193 (Fig. 17). The lever 205 is normally biased by a spring 208 into engagement with a stop 209 provided on the base plate 20. When the lever 205 is in this position, the toe 206 is held out of engagement with the hooked portion 207 of the lever 193. The lever 205 is adapted to be manually moved in a clockwise direction about its axis 210 to engage the toe 206 with the hooked end 207 of the lever 193, thereby moving the lever 193 to move the pin 197 downwardly. The downward movement of the pin 197 by means of the member 198 closes the mercury switch 202 and starts the motor 47 for carrying out a record-changing cycle.

As an additional feature, the mechanism may be set manually to play only one side of a record before returning the record to the magazine. To accomplish this, there is provided an L-shaped lever 212 (Figs. 1 and 3). An upturned end 213 of the lever 212 is biased by a spring 214 (Fig. 3) into engagement with either one of a pair of notches, 215 and 216, provided in the base plate 20. A properly labeled escutcheon 217 as shown in Fig. 1 shows the operator when the lever 212 is set so that the mechanism will play one side of a record before returning it to the magazine and when the mechanism will play both sides of a record before returning it to the magazine.

When the upturned end 213 of lever 212 is set in the notch 215 (Fig. 1) the mechanism is set so that a lever 218 is held in the solid line position, out of the path of movement of an ear 219 provided on the lever 102, as shown in Fig. 16. With the levers 212 and 218 in this position, the mechanism will operate to play both sides of a record, before returning the record to the magazine 35 as heretofore described.

When the upturned end 213 of the lever 212 is manually moved into engagement with the notch 216 (Fig. 1), the lever 218 is moved to the dotted-line position shown in Fig. 16. With the lever 218 in this latter position, the lower end of the lever 218 in this latter position, the lower end of the lever 218 is in the path of movement of the ear 219 of the lever 102. When the mechanism is tripped and the beam 80 and the member 103 is moved downwardly (Fig. 16) in the manner previously described, the angularly formed ear 219 of the lever 102 moves into engagement with the lever 218. As the bar 103 and therewith the lever 102 continues to move downwardly, the lever 218 in moving over the angularly formed ear 219 causes the lever 102 to pivot about axis 220 (Fig. 16) in a counterclockwise direction against the biasing action of a spring 221.

As the lever 102 pivots about the axis 220 as previously described, the hooked end 101 of the lever 102 is moved out of the path of movement of the spring-biased pin 99 of the cam member 100. As the cam 100 with the pin 99 moves about the shaft 49, the pin 99 does not engage the hooked end 101 of the lever 102, and as a result, the bar 103 will not be moved to retract the pin 78 from the cam track 77 and to move the pin 96 in the cam track 97. With the pin 78 following the groove 77 of the cam wheel 50, the apparatus will operate to return a record to the magazine 35 after one side has been played, and to place a new record in playing position upon the turntable 21 in the manner previously described. Immediately thereafter, the cam wheel 50, by means of the pin 78, moves the beam 80 and therewith the lever 102 to the position shown in Fig. 16. The lever 102 is brought back to this position to rest against an ear 222 by means of the spring 221.

The general mode of operation of the record-changing apparatus will now be described. After a stack of records has been placed in the magazine 35 and the lever 213 is in the notch 216, a master switch is closed to start both of the motors 25 and 47. The motor 25 starts to rotate the turntable 21 and the motor 47 drives the shaft 49 to which is affixed the cam wheel 50.

The cam wheel 50 in rotating causes the cam 51 to engage the roller 55, moving the lever 52 about its axis 53 moving the rod 56 downwardly, thereupon moving the lever 60 about its axis 61 sufficiently far to lift the rear record and release it from the magazine 35. In this mode of operation it is assumed that the released record is a ten-inch record. The record then drops so that the lower edge rests on the cushioned pads 63.

As the cam wheel 50 rotates, the beam 69 is moved upwardly by the pin 68, which follows the cam track 67 (Fig. 2). This upward movement of the beam 69 transmits rotary motion to the shaft 53 and the segmental gear 72 affixed thereto. The rotary movement of the segmental gear 72, which is in engagement with the gear portion 73 provided on the pan 66 causes the pan 66 to swing downwardly. The pan 66 in moving downwardly, causes the extension 74 to move upwardly between the pads 63 to engage and lift the released record off of the pads 63.

Continued movement of the cam wheel 50 causes the beam 80 to move upwardly (Fig. 2) as the pin 78 (Fig. 10) follows the cam track 77 (Figs. 9 and 10). This upward movement of the beam 80 causes the lever 83 to rotate in a clockwise direction (Fig. 2) moving the link 87 downwardly and swinging the magazine 35 in a clockwise direction. When the magazine is moved thus, it cooperates with the pan 66 to slide the released record along the turntable. Continued movement of the cam wheel 50 moves the beam 80 downwardly, returning the magazine 35 to the position shown by full lines in Figure 2. The return movement of the magazine 35 permits the released record to drop into playing position upon the turntable.

The cam wheel 139 which rotates with the shaft 49 has by this time rotated sufficiently far so that the spring 164 which is under tension moves the plate 158 and the arm 162 which in turn move the pickup arm 28 inwardly to position the stylus over the outermost groove of the record on the turntable. Immediately thereafter, the roller 142 descends into the notch 141 of the cam wheel 139, allowing the rod 145 to descend and therewith the pickup arm 28 so that the stylus engages the outermost groove of the record on the turntable. The driving motor 47 is shut off automatically immediately thereafter.

When the stylus of the pickup arm 28 reaches the inner groove of the record on the turntable, the tripping mechanism, including the plate 147, the levers 181, 182, 182A and 193 and the ear 188 (Figs. 16, 17 and 18) is actuated, whereby the lever 197 is moved out of engagement with the lever 201, to close the mercury switch for starting the motor 47 which drives the shaft 49.

As the cam wheel 139 rotates with the shaft 49, the cam surface 140 (Fig. 11) moves the roller 142 and the lever 143 upwardly. The movement of the lever 143 raises the pin 145 (Fig. 15) which in turn raises the pickup arm 28 and the stylus thereon out of engagement with the record. Continued movement of the cam wheel 139 causes the cam surface 156 to move in a counterclockwise direction (Fig. 12) the pin 157 and the plate 158. The left wall of the aperture 159 of plate 158 engages and moves the pin 160 and the lever 162 to swing the pickup arm outwardly from above the turntable.

While the pickup arm is being swung to its outwardmost position, the end 110 of the L-shaped lever 109 is moved out of engagement with the finger 111 by means of members 102, 106, 107 and 108 as explained hereinbefore.

Shortly thereafter the roller 116 which is in engagement with the cam surface 118 on the revolving cam wheel 50 moves to the right looking at Figure 8. This allows the lever 114 and the segmental gear 112 to rotate clockwise directions. In rotating in a clockwise direction the finger 111 affixed to the segmental gear 112 moves the lever 133 in a counterclockwise direction. This movement of the lever 133 moves the lever 52 and therewith the roller 55 out of the path of the cam 51 on the cam wheel 50. In rotating in a clockwise direction the gear 112 also drives the pinion 120 and therewith the shaft 121 to swing the reversing member 119 from one side of the magazine 35 as shown in Figure 3 to a position in front of the magazine 35 as shown in Figure 5.

Immediately after the tripping mechanism was actuated to start the rotation of the shaft 49, the pin 99 of the cam 100, which is fixed to the shaft 49, engages and moves to the right (Fig. 16) the lever 102 and therewith the member 103. This movement of the member 103 rocks the T-shaped lever 105 to retract pin 78 from engagement with the cam groove 77 of cam wheel 50 and to move the pin 96 into engagement with the cam groove 97 of cam wheel 50.

As the cam wheel 50 continues to rotate, the beam 69 moves upwardly (Fig. 2) swinging the pan 66 upwardly to move the record from the turntable to a position against the reversing member 119. Thereafter, as the beam 69 moves downwardly the pan 66 moves to a position below and parallel with the turntable. As the pan 66 is moving downwardly toward the turntable, the beam 80, whose path is now controlled by the pin 96 which is following the cam groove 97 of the cam wheel 50, is moved to swing the magazine 35 in a counterclockwise direction (Fig. 2). This movement of the magazine 35 allows it to cooperate with the pan 66 and the reversing member 119 in returning the record to the turntable in reversed position.

After the magazine 35 returns to its normal position as shown by full lines in Figure 2, the cam member 100 engages the roller 136, which is fixed to the member 103, for moving the bar 103 to the left (Fig. 10). This movement of the member 103 rocks the T-shaped lever 105 so that the pin 96 is moved out of engagement with the cam groove 97 and the pin 78 is moved into engagement with the cam groove 77.

By this time the cam wheel 50 has rotated sufficiently far so that the cam surface 118 allows the counterclockwise movement of the lever 114 and the segmental gear (Fig. 8). As the gear 112 rotates thus, the pinion gear 120 is rotated in a clockwise direction, turning the shaft 121 to swing the reversing member 119 from a position in front of the magazine 35 as shown in Figure 5 to a position on the side of the magazine as shown in Figure 3. The same counterclockwise movement of the segmental gear 112 also moves the finger 111 away from the end of the arm 133. This permits the spring 135 to move the lever 52 and the roller 55 into the path of the cam 51 of cam wheel 50.

Shortly thereafter the cam portion 166 of the cam surface 156 moves into engagement of the pin 157. This allows the plate 158, to which the pin 157 is fixed, to rotate in a counterclockwise direction (Fig. 12) about the axis 158A. This counterclockwise movement of the plate 158 causes the right-hand side of the aperture 159 to engage and move the pin 161 and the arm 162 in a clockwise direction (Fig. 12) about the shaft 46 to swing the pickup arm 28 inwardly. When the pin 157 engages the portion 168 of the cam surface 160 (Fig. 14), the stylus of the pickup arm 28 is approximately over the outer groove of the record on the turntable. Continued movement of the cam wheel 139 lowers the lever 143, the pin 145 and the pickup arm 28 and brings the stylus into engagement with the outer groove of the record.

While the pickup arm is being swung from its outwardmost position to a position over the outer groove of the record on the turntable, the cam wheel 50 continues to rotate to move the beam 80. This movement of the beam 80 causes the finger 106 (Fig. 16) to move out of engagement with the lower end of the lever 107. This permits the spring 135 to move the lever 109 in a clockwise direction (Fig. 8) to engage the finger 111 so that the reversing member 119 will not be operated during the next cycle of operation.

The lever 199 which rotates with the shaft 49 has by this time moved to a position to where the member 198 engages the ear 200 of the lever 201. Continued movement of the lever 199 swings the lever 201 in a clockwise direction (Fig. 20) returning the mercury switch 202 to the position shown in Fig. 20. When the mercury switch is in the latter position the circuit to the motor 47 is opened and motor stops.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an automatic record-changing apparatus, the combination comprising a magazine adapted to be moved over two different distances; driving means for moving said magazine; connecting means associated with said magazine; mechanism movably associated with said connecting means and having first and second elements for alternately cooperating with said driving means to move said magazine said different distances; an actuating member movably connected to said driving means for moving said mechanism, whereby said first element is moved into cooperative relationship with said driving means and said second element is moved out of cooperative relationship with said driving means; and a movable member operatively associated with said actuating member and adapted to be moved into an operative position by said connecting means for moving said mechanism, whereby said second element is moved into cooperative relationship with said driving means and said first element is moved out of cooperative relationship with said driving means.

2. In an automatic record-changing apparatus, the combination comprising a magazine adapted to be moved over two different distances; driving means for moving said magazine; connecting means associated with said magazine; mechanism movably associated with said connecting means and having first and second elements for alternately cooperating with said driving means to move said magazine said different distances; an actuating member movably connected to said driving means for moving said mechanism, whereby said first element is moved into cooperative relationship with said driving means and said second element is moved out of cooperative relationship with said driving means; a movable member operatively associated with said actuating member and adapted to be moved into an operative position by said connecting means for moving said mechanism, whereby said second element is moved into cooperative relationship with said driving means and said first element is moved out of cooperative relationship with said driving means; and means for adjusting said mechanism, whereby said movable member is ineffective to move said mechanism.

3. In an automatic phonograph having a turntable; the combination comprising a driving means for carrying out a record-changing cycle and a record-reversing cycle; a movable magazine for supporting a plurality of records, said magazine being movable a first distance during said record-changing cycle and a second distance during said record-reversing cycle; connecting means associated with said magazine;

mechanism movably associated with said connecting means and having first and second adjustable elements, said mechanism being movable in one direction to bring said first element into cooperative relationship with said driving means during a record-changing cycle for moving said magazine said first distance and movable in another direction to bring said second element into cooperative relationship with said driving means during a record-reversing cycle for moving said magazine said second distance; a record-releasing means movable by said driving means during said record-changing cycle for releasing a record from said magazine; an oscillatory member movable by said driving means for guiding a record during said record-changing and record-reversing cycles; a record-reversing movable member for cooperating with said magazine and said oscillatory member for reversing a record on said turntable; control means movable by said driving means during said record-reversing cycle for moving said record-releasing means into an inoperative position and said record-reversing member into operative position, movable stop means operatively associated with the said control means for preventing movement of said control means during a record-changing cycle, said stop means being movable away from said control means by said mechanism and actuating means connected to said driving means for moving said mechanism.

4. In an automatic phonograph having a turntable; the combination comprising a driving means including a cam means for carrying out a record-changing cycle and a record-reversing cycle; a movable magazine for supporting a plurality of records, said magazine being movable a first distance during said record-changing cycle and a second distance during said record-reversing cycle; connecting means associated with said magazine; mechanism movably associated with said connecting means and having first and second adjustable elements, said mechanism being movable to bring said first element into cooperative relationship with said cam means during a record-changing cycle for moving said magazine said first distance and to bring said second element into cooperative relationship with said cam means during a record-reversing cycle for moving said magazine said second distance; a record-releasing means movable by said cam means during record-changing cycle for releasing a record from said magazine; an oscillatory member movable by said driving means for guiding a record during said record-changing and record-reversing cycles; a record-reversing member movable during a record-reversing cycle for cooperating with said magazine and said oscillatory member for reversing a record on said turntable; control means driven by the cam means and associated with said record-releasing means and the record-reversing means for moving said record-releasing means into an inoperative position and the record-reversing means into an operative position during said record-changing cycle; movable stop means operatively associated with the said control means during a record-changing cycle, said stop means being movable away from said control means by said mechanism and actuating means connected to said driving means for moving said mechanism.

5. In an automatic phonograph having a turntable; the combination comprising a driving means for carrying out a record-changing cycle and a record-reversing cycle; a movable magazine for supporting a plurality of records, said magazine being movable a first distance during said record-changing cycle and a second distance during said record-reversing cycle; connecting means associated with said magazine; mechanism movably associated with said connecting means and having first and second adjustable elements, said mechanism being movable to bring said first element into cooperative relationship with said driving means during a record-changing cycle for moving said magazine said first distance and to bring said second element into cooperative relationship with said driving means during a record-reversing cycle for moving said magazine said second distance; a record-releasing means movable by said driving means during said record-changing cycle for releasing a record from said magazine; an oscillatory member movable by said driving means for guiding a record during said record-changing and record-reversing cycles; a record-reversing means movable by said driving means during said record-reversing cycle for cooperating with said magazine and said oscillatory member for reversing a record on said turntable; means movable by said mechanism for controlling the operation of the record-reversing means and the record-releasing means; actuating means movably connected to said driving means to move said mechanism for moving, during said record-changing cycle, said first element into cooperative relationship with said driving means; and a movable member on said actuating means and adapted to be moved relative thereto into operative and inoperative positions, said movable member, when in said operative position, being adapted to move said mechanism, during said record-reversing cycle, for moving said second element into cooperative relationship with said driving means.

6. In an automatic phonograph having a turntable; the combination comprising a driving means for carrying out a record-changing cycle and a record-reversing cycle; a movable magazine for supporting a plurality of records, said magazine being movable a first distance during said record-changing cycle and a second distance during said record-reversing cycle; connecting means associated with said magazine; mechanism movably associated with said connecting means and having first and second adjustable elements, said mechanism being movable to bring said first element into cooperative relationship with said driving means during a record-changing cycle for moving said magazine said first distance and to bring said second element into cooperative relationship with said driving means during a record-reversing cycle for moving said magazine said second distance; a record-releasing means movable by said driving means during said record-changing cycle for releasing a record from said magazine; an oscillatory member movable by said driving means for guiding a record during said record-changing and record-reversing cycles; a record-reversing means for cooperating with said magazine and said oscillatory member during said record-reversing cycle for reversing a record on said turntable; means associated with said record-reversing means and actuated by said mechanism for releasing said record-reversing means into operative condition to be driven by said driving means and to move said record-releasing means into an inoperative position during said record-reversing cycle; and actuating means movably connected to said driving means for moving said mechanism.

7. In an automatic phonograph having a turntable; the combination comprising a driving means for carrying out a record-changing cycle and a record-reversing cycle; a movable magazine for supporting a plurality of records, said magazine being movable a first distance during said record-changing cycle and a second distance during said record-reversing cycle; connecting means associated with said magazine; mechanism movably associated with said connecting means and having first and second adjustable elements, said mechanism being movable to bring said first element into cooperative relationship with said driving means during a record-changing cycle for moving said magazine said first distance and to bring said second element into cooperative relationship with said driving means during a record-reversing cycle for moving said magazine said second distance; a record-releasing member movable by said driving means during said record-changing cycle for releasing a record from said magazine and movable under the control of said mechanism during said record-reversing cycle into an inoperative position; an oscillatory member movable by said driving means for guiding a record during said record-changing and record-reversing cycles; a record-reversing member movable by said mechanism during said record-reversing cycle for cooperating with said magazine and said oscillatory member for reversing a record on said turntable; actuating means movably connected to said driving means to move said mechanism for moving, during said record-changing cycle, said first element into cooperative relationship with said driving means; a movable member on said actuating member and adapted to be moved relative thereto into operative and inoperative positions, said movable member, when in said operative position, being adapted to move said mechanism, during said record-reversing cycle, for moving said second element into cooperative relationship with said driving means; means on said connecting means for moving said movable member into said operative position for operating during said record-reversing cycle; and means on said mechanism for moving said movable member into said inoperative position for being ineffective during said record-changing cycle.

FRITZ KAHL.
ARTHUR L. KNOX.

CERTIFICATE OF CORRECTION.

Patent No. 2,332,650.                              October 26, 1943.

ARTHUR L. KNOX, ET AL.

It is hereby certified that error appears in the printed specification of the above numbered patent requiring correction as follows: Page 3, second column, lines 9 and 10, strike out the words "against the biasing"; page 4, first column, line 46, for "lever 105" read --member 105--; page 4, second column, line 44, for "engagement" read --the movement--; and that the said Letters Patent should be read with this correction therein that the same may conform to the record of the case in the Patent Office.

Signed and sealed this 1st day of February, A. D. 1944.

(Seal)

Henry Van Arsdale,
Acting Commissioner of Patents.